(12) United States Patent
Bourget

(10) Patent No.: US 9,697,531 B1
(45) Date of Patent: Jul. 4, 2017

(54) DYNAMIC PRICING FOR PHYSICAL STORES

(71) Applicant: Square, Inc., San Francisco, CA (US)

(72) Inventor: Erik William Bourget, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 53 days.

(21) Appl. No.: 14/032,585

(22) Filed: Sep. 20, 2013

(51) Int. Cl.
*G06Q 30/00* (2012.01)
*G06Q 30/02* (2012.01)

(52) U.S. Cl.
CPC .............................. *G06Q 30/0206* (2013.01)

(58) Field of Classification Search
None
See application file for complete search history.

(56) References Cited

U.S. PATENT DOCUMENTS

| | | | |
|---|---|---|---|
| 6,505,168 B1 | 1/2003 | Rothman et al. | |
| 6,694,300 B1 | 2/2004 | Walker et al. | |
| 7,092,929 B1* | 8/2006 | Dvorak et al. | 705/28 |
| 7,379,916 B1 | 5/2008 | Mizrah | |
| 8,175,908 B1 | 5/2012 | Anderson | |
| 8,868,522 B1 | 10/2014 | Zennaro et al. | |
| 2001/0014868 A1* | 8/2001 | Herz et al. | 705/14 |
| 2001/0047308 A1* | 11/2001 | Kaminsky et al. | 705/26 |
| 2002/0087384 A1 | 7/2002 | Neifeld | |
| 2002/0143655 A1 | 10/2002 | Elston et al. | |
| 2003/0132298 A1* | 7/2003 | Swartz et al. | 235/472.02 |
| 2003/0191709 A1 | 10/2003 | Elston et al. | |
| 2004/0198389 A1* | 10/2004 | Alcock et al. | 455/456.1 |
| 2005/0060245 A1* | 3/2005 | Hoffman et al. | 705/28 |
| 2005/0139662 A1* | 6/2005 | Eglen et al. | 235/383 |
| 2006/0064392 A1 | 3/2006 | Glisson | |
| 2006/0223508 A1 | 10/2006 | Starr et al. | |
| 2006/0237531 A1 | 10/2006 | Heffez et al. | |
| 2007/0130090 A1* | 6/2007 | Staib et al. | 705/400 |
| 2007/0179836 A1 | 8/2007 | Juang et al. | |
| 2007/0250440 A1 | 10/2007 | Paulsen et al. | |
| 2007/0250441 A1 | 10/2007 | Paulsen et al. | |
| 2007/0270165 A1 | 11/2007 | Poosala | |

(Continued)

OTHER PUBLICATIONS

*Uber*. Google Play. Published on Nov. 10, 2014. Retrieved from the internet on Nov. 12, 2014. Retrieved from the internet: URL<https://play.google.com/store/apps/details?id=com.ubercab&hl=en>. 2 pages.

(Continued)

*Primary Examiner* — Gurkanwaljit Singh
(74) *Attorney, Agent, or Firm* — Lee & Hayes, PLLC

(57) ABSTRACT

Techniques of dynamic pricing for physical stores are described. A server handling purchase transactions of multiple physical stores can aggregate sales data on goods and services and determine a pattern. The server can determine that sales of an item of goods or services at a particular physical store deviate from the pattern at a particular time. Upon determining that sales price of the item significantly correlates to the deviation, the server can determine a suggested price for correcting the deviation. As an experiment, the server can conduct an experiment of selling the item at the suggested price at the particular time for a given time period. The server can present results of the experiment to an operator of the physical store.

18 Claims, 7 Drawing Sheets

(56) References Cited

U.S. PATENT DOCUMENTS

| | | |
|---|---|---|
| 2008/0033805 A1 | 2/2008 | Padin |
| 2008/0249837 A1 | 10/2008 | Angell et al. |
| 2008/0262935 A1 | 10/2008 | Baumgartner et al. |
| 2009/0076896 A1 | 3/2009 | DeWitt et al. |
| 2009/0076925 A1 | 3/2009 | DeWitt et al. |
| 2009/0094237 A1 | 4/2009 | Churi et al. |
| 2010/0076813 A1 | 3/2010 | Ghosh et al. |
| 2010/0274680 A1 | 10/2010 | Carlson et al. |
| 2010/0306032 A1 | 12/2010 | Jolley |
| 2011/0004506 A1* | 1/2011 | May et al. ............... 705/10 |
| 2011/0035288 A1 | 2/2011 | Clyne |
| 2011/0087547 A1 | 4/2011 | Amaro et al. |
| 2011/0093326 A1 | 4/2011 | Bous et al. |
| 2011/0112897 A1 | 5/2011 | Tietzen et al. |
| 2011/0119122 A1 | 5/2011 | Padam et al. |
| 2011/0238517 A1 | 9/2011 | Ramalingam et al. |
| 2011/0246272 A1 | 10/2011 | Joa et al. |
| 2011/0264581 A1 | 10/2011 | Clyne |
| 2011/0302011 A1 | 12/2011 | Yoder et al. |
| 2011/0302013 A1* | 12/2011 | Dance et al. ........... 705/14.19 |
| 2011/0313874 A1 | 12/2011 | Hardie et al. |
| 2012/0005019 A1 | 1/2012 | LeBlanc et al. |
| 2012/0094639 A1 | 4/2012 | Carlson et al. |
| 2012/0239524 A1* | 9/2012 | Ouimet et al. ........... 705/26.7 |
| 2012/0290349 A1 | 11/2012 | Burkhart et al. |
| 2012/0323681 A1 | 12/2012 | Bercaw |
| 2013/0031006 A1 | 1/2013 | McCullagh et al. |
| 2013/0066740 A1* | 3/2013 | Ouimet et al. ........... 705/26.7 |
| 2013/0132140 A1 | 5/2013 | Amin et al. |
| 2013/0132246 A1 | 5/2013 | Amin et al. |
| 2013/0132887 A1 | 5/2013 | Amin et al. |
| 2013/0204791 A1 | 8/2013 | Dorsey et al. |
| 2013/0246207 A1 | 9/2013 | Novak et al. |
| 2013/0246301 A1 | 9/2013 | Radhakrishnan et al. |
| 2013/0276020 A1 | 10/2013 | Khan |
| 2014/0089133 A1 | 3/2014 | Argue et al. |
| 2014/0122137 A1 | 5/2014 | Nelson et al. |
| 2014/0129135 A1 | 5/2014 | Holden et al. |
| 2014/0129302 A1 | 5/2014 | Amin et al. |
| 2014/0129951 A1 | 5/2014 | Amin et al. |
| 2014/0156449 A1 | 6/2014 | Ganesan et al. |
| 2014/0180767 A1 | 6/2014 | Villars |
| 2014/0214562 A1 | 7/2014 | Cancro et al. |
| 2014/0214572 A1 | 7/2014 | Cancro et al. |
| 2014/0240725 A1 | 8/2014 | Banfield et al. |
| 2014/0278804 A1* | 9/2014 | Lanxner et al. ........... 705/7.35 |
| 2014/0344093 A1 | 11/2014 | Du et al. |
| 2015/0051994 A1 | 2/2015 | Ward et al. |
| 2015/0058088 A1 | 2/2015 | Unser et al. |
| 2015/0269642 A1 | 9/2015 | Cai et al. |

OTHER PUBLICATIONS

Non-Final Office Action mailed Sep. 12, 2014, for U.S. Appl. No. 14/284,856 of Perrone, G., et al., filed May 22, 2014.
Final Office Action mailed Jan. 16, 2015, for U.S. Appl. No. 14/284,856 of Perrone, G., et al., filed May 22, 2014.
Non-Final Office Action mailed Oct. 5, 2015, for U.S. Appl. No. 14/284,856 of Perrone, G., et al., filed May 22, 2014.
Non-Final Office Action mailed Nov. 20, 2015, for U.S. Appl. No. 14/284,926 of Perrone, G., et al., filed May 22, 2014.
Final Office Action mailed Jun. 21, 2016, for U.S. Appl. No. 14/284,926 of Perrone, G., et al., filed May 22, 2014.
Non-Final Office Action mailed Jul. 28, 2016, for U.S. Appl. No. 14/289,469 of Kumar, A., et al., filed May 28, 2014.
Non-Final Office Action mailed Jul. 29, 2016, for U.S. Appl. No. 14/284,980 of Perrone, G., et al., filed May 22, 2014.
Advisory Action mailed Sep. 26, 2016, for U.S. Appl. No. 14/284,926 of Perrone, G., et al., filed May 22, 2014.
Final Office Action mailed Nov. 25, 2016, for U.S Appl. No. 14/284,856, of Perrone, G., et al., filed May 22, 2014.
Non-Final Office Action mailed Dec. 19, 2016, for U.S. Appl. No. 14/289,443, of Kumar, A., et al., filed May 28, 2014.
Final Office Action mailed Dec. 21, 2016, for U.S. Appl. No. 14/284,980, of Perrone, G., et al., filed May 22, 2014.
Notice of Allowance mailed Dec. 23, 2016, for U.S. Appl. No. 14/289,469, of Kumar, A., et al., filed May 28, 2014.
Advisory Action mailed Feb. 22, 2017, for U.S. Appl. No. 14/284,980, of Perrone, G., et al., filed May 22, 2014.
Advisory Action mailed Feb. 24, 2017, for U.S. Appl. No. 14/284,856, of Perrone, G., et al., filed May 22, 2014.

\* cited by examiner

DYNAMIC PRICING FOR PHYSICAL STORES

BACKGROUND

Some online businesses sell virtual products using automatic pricing. For example, an online content provider can determine prices of advertisement slots for selling to advertisers. Using historical page view data, the online content provider can estimate demand on a particular advertisement slot. The online content provider can then determine a price of the advertisement slot based on the demand. Alternatively, the online content provider can allow advertisers to bid for the advertisement slot in an auction.

A physical store selling goods or services can face marketing challenges that are different from those of online content providers selling advertisement slots. For example, the physical store may not have sufficient amount of historical data for performing demand analysis. In addition, in determining a price of an item, the physical store usually takes into account a cost (e.g., a wholesale price) paid for the item. Relatively few physical stores sell goods or services through auctions.

BRIEF DESCRIPTION OF THE DRAWINGS

Like reference symbols in the various drawings indicate like elements.

DETAILED DESCRIPTION

Techniques of dynamic pricing for physical stores are described. A server handling purchase transactions of multiple physical stores can aggregate sales data on goods and services and determine a pattern. The server can determine that sales of an item of goods or services at a particular physical store deviate from the pattern at a particular time. Upon determining that sales price of the item at that physical store significantly correlates to the deviation, the server can determine a suggested price for correcting the deviation. As an experiment, the server can sell the item at the suggested price at the particular time for a given time period. The server can present results of the experiment to an operator of the physical store.

The features described in this specification can be implemented to achieve one or more advantages. For example, compared to conventional automatic pricing techniques that are applied to virtual items, the features described in this specification can apply dynamic pricing to physical items sold at physical stores, where each individual physical store may not have sufficient resources to perform demand analysis. In addition, dynamic pricing for physical stores can account for cost of the physical items sold.

The features described in this specification can automatically set prices of items carried by a physical store. A system knowing the market trend can provide an optimum pricing strategy for the physical store on an on-going basis. Accordingly, an operator of the physical store can spend fewer resources on determining prices of merchandise items the store carries, and focus more resources on quality or customer service.

The details of one or more implementations of dynamic pricing for physical stores are set forth in the accompanying drawings and the description below. Other features, aspects, and advantages of dynamic pricing for physical stores will become apparent from the description, the drawings, and the claims.

Figure 1:
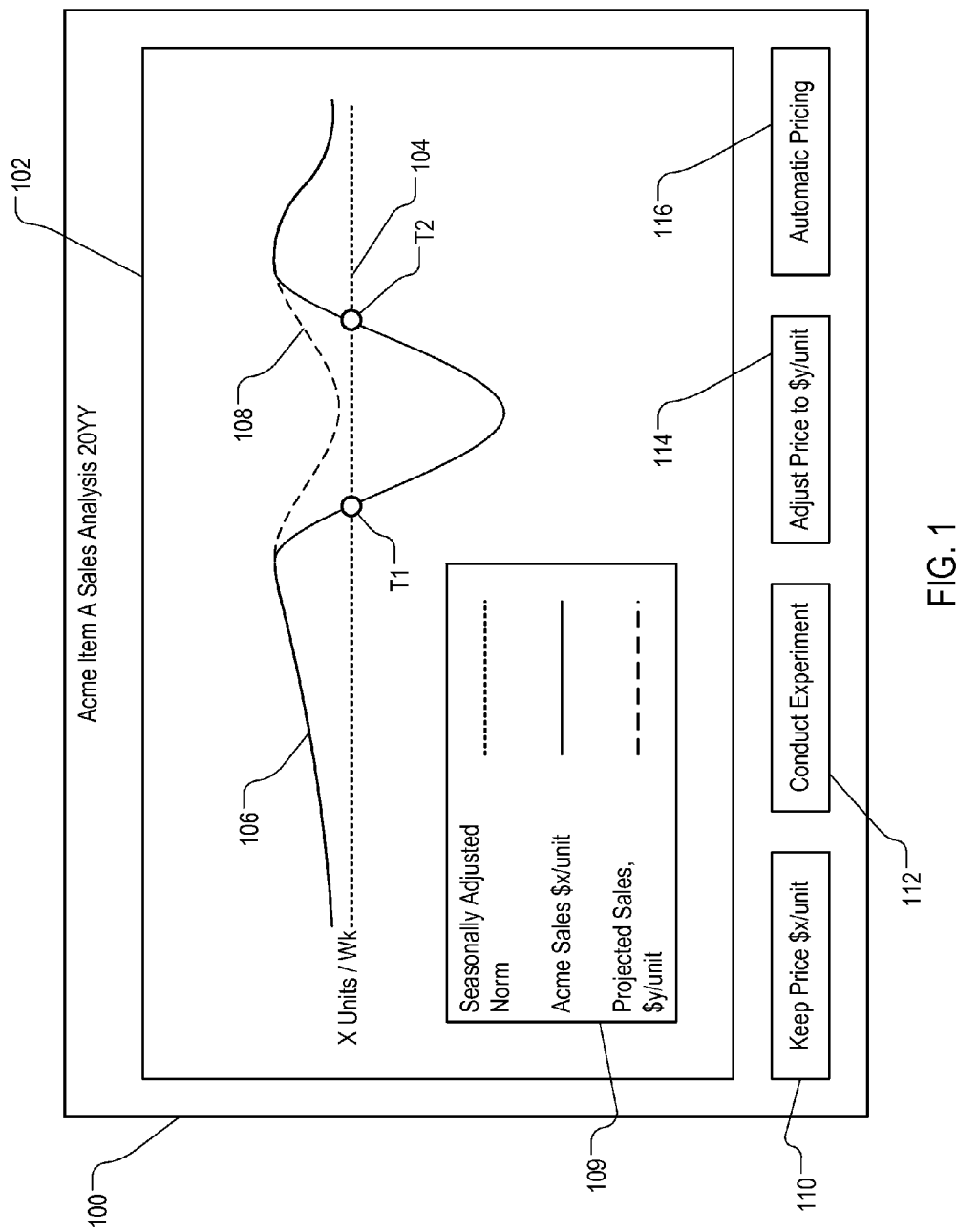
FIG. 1 is an exemplary user interface of a system implementing dynamic pricing for physical stores.

FIG. 1 is an exemplary user interface 100 of a system implementing dynamic pricing for physical stores. The system can be a payment processing system that handles backend financial transactions for multiple physical stores. The system is described in further details in reference to FIG. 3. The system includes one or more server computers providing the user interface 100 for display on a user device. For example, the system can include a web server configured to provide the user interface 100 for display in a web browser on a laptop or tablet computer.

The system determines an expected sales quantity of a merchandise item ("item A") sold at a physical store ("Acme"). Item A can be an item of goods or services. The expected sales quantity is a quantity of item A that the system expects the physical store to sell over a period of time. The system can represent the expected sales quantity of item A in a suggestion area 102 of the user interface 100 as an expected sales representation 104. The suggestion area 102 is a display area where the system can present expected, current, and predicted future sales quantities of item A, and suggestions on how to reach the future sales quantity from the current sales quantity. The expected sales representation 104, as well as representations of the current and future sales quantities, can be a graph (e.g., bar graph, line graph, or pie graph) or text (e.g., a table or a text paragraph).

The system can determine the expected sales quantity based on historical sales quantity, comparative sales quantity, or both. To determine the expected sales quantity based on historical sales quantity, the system analyzes past sales data of the physical store Acme. The past sales data include sales transactions of item A for a sufficient long period of time (e.g., longer than a threshold number of days, weeks, months, or years). The system can determine an average sales quantity of item A for a time period (e.g., a day, week, month, or year) and represent the average sales quantity using expected sales representation 104. For example, the system can determine that, for the past N years (N>=1), the average sales quantity of item A is X units per week. The system can designate a time period to be one year, and each week in that year to be a time slot. The system can represent the quantity of X units per week for a year as a line.

To determine the expected sales quantity based on comparative sales quantity, the system analyzes sales data of a group of physical stores that includes at least one physical store other than Acme and unrelated to Acme. The physical store unrelated to Acme has no sales data of Acme. Likewise, Acme has no sales data of that physical store. The group of physical stores may or may not include physical store Acme. The system can select the group of physical stores based on similarity between each store and physical store Acme. The similarity can include a similar location (e.g., located within a same postal code area as physical store Acme), similar operating hours, similar size, similar revenue, similar business classification, other relevant aspects, or any combination of the above. The system can collect the sales data of past transactions on each of the physical stores in the group. The system then anonymizes the sales data. The system can represent a time period (e.g., a year) of the sales data as expected sales representation 104.

Expected sales representation 104 is represented as a straight line in FIG. 1. Based on sales data, expected sales representation 104 can be a curve if the value X varies week by week. In some implementations, the system can display the curve. In some implementations, the system can scale the curve into a straight line by seasonally adjusting the sales quantity.

The system determines current sales quantity of item A sold by physical store Acme. The system can determine the current sales quantity based on transaction information of sales of item A received from physical store Acme. The current sales quantity can include quantity of item A sold during a specified time period (e.g., a most recent year). The specified time period may or may not include a present time. For example, the specified time period can be year 200Y, a year in the past. The system can determine one or more time period options (e.g., year, month, week, or day) and allow a user to select the time period. The system can provide the current sales quantity for display in the suggestion area 102 using current sales representation 106. The system can overlay the current sales representation 106 on expected sales representation 104.

The system determines, based on the expected sales quantity and the current sales quantity, that, in a time slot [T1, T2] (where T1 is a start time, and T2 is an end time), the current sales quantity of item A deviates from the expected sales quantity by a significant amount. The system can determine that the deviation is significant upon determining that a difference between expected sales quantity and the current sales quantity exceeds a threshold number of quantity (e.g., 100 units) or exceeds a threshold ratio (e.g., more than 20 percent of the expected sales quantity).

Upon determining that the deviation is significant, the system can determine one or more variables correlated to the deviation. The correlated variable can include merchant parameters (e.g., price of item A at Acme in the past and in the time period corresponding to the current sales), item parameters (e.g., whether item A is bundled with item B) or other parameters. The correlated variable can include parameters indicating correlation with other merchants. For example, the correlated variable can include publicly available data from large retailer price reductions. The correlated variable can include item popularity over multiple merchants. Upon determining that a particular item has reduced in popularity for X weeks across more than a threshold number of relaters, the item can determine that the reduction in popularity is correlated to the deviation. The system can determine that seasonality or customer mix seen at a retailer is correlated. The system can determine one or more most strongly correlated variables using a statistical model. The system can determine that price of item A is among the one or more most strongly correlated variables.

For example, the system can determine that other physical stores located in the same postal code area of physical store Acme offer a discount for the duration of the time slot between T1 and T2. The system determines, based on merchant entered and anonymized data, that similar physical stores offer a "back to school" discount during given weeks of year or a "happy hour" discount during given hours of day. The system can determine that all other parameters of item A sold at Acme are same as those in similar physical stores, except that physical store Acme does not offer a discount on item A for the duration of the time slot between [T1, T2]. The system can determine that price of item A (x dollars per unit at physical store Acme), lacking a discount, is a variable most strongly correlated to the deviation.

The system can determine, using the statistical model, a degree of correlation between the price and the deviation. Based on the degree of correlation, and based on a merchant cost (e.g., a wholesale price at which Acme bought item A), the system can determine a suggested price (e.g., y dollars per unit of item A). The system can determine the merchant cost based on a user input (e.g., an input by an operator of physical store Acme). The system can determine the suggested price based on a maximum revenue or a maximum profit calculated using the cost, a difference between the suggested price y and the current price x, and a projected increase (or decrease) in sales quantity of item A at physical store Acme during time slot [T1, T2] associated with the difference. The system can provide the projected sales quantity (after the increase or decrease) at the suggested sales price for display in suggestion area 102 using projected sales representation 108. The system can overlay projected sales representation 108 on expected sales representation 104 and current sales representation 106.

The system can provide the suggested price, or its equivalent (e.g., a difference between the current price x and the suggested price y), for display in suggestion box 109. The system can provide for display in user interface 100 option items 110, 112, 114, and 116. Upon receiving an input selecting the option item 110, the system can keep item A at the current price at physical store Acme. Upon receiving an input selecting the option item 112, the system can perform an experiment using the suggested price (y dollars per unit). More details on performing the experiment are described in reference to FIG. 2. Upon receiving an input selecting the option item 114, the system can change price of item A to the suggested price at physical store Acme, subject to manual adjustment. Upon receiving an input selecting the option item 116, the system can perform routine calculations in the future to determine if any deviation occurs. If yes, the system can change price of item A automatically and without user intervention in the future. Additional details on changing prices of an item sold at a physical store using a payment processing system are described below in reference to FIG. 3.

Figure 2:
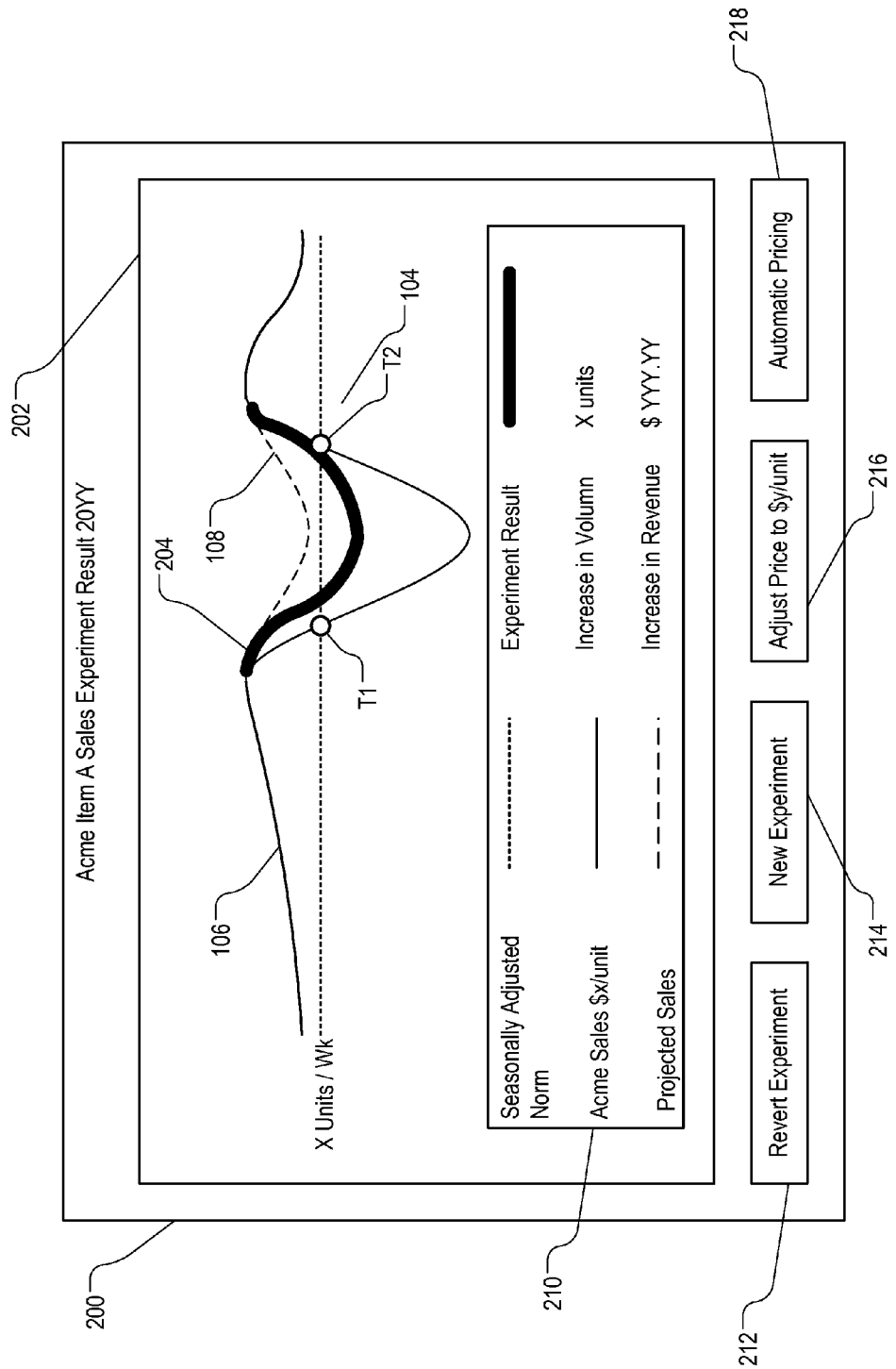
FIG. 2 is an exemplary user interface of a system implementing dynamic pricing for physical stores based on experiment.

FIG. 2 is exemplary user interface 200 of a system implementing dynamic pricing for physical stores based on experiment. Upon receiving an input selecting option item 112 (of FIG. 1), the system can sell item A at a changed price for a period of time as an experiment to determine whether changing the price of item A to a suggested price leads to a projected change in sales quantity of item A.

Upon receiving the input, the system can change the price (e.g., x dollars per unit) of item A at physical store Acme. The system can change the price by remotely reconfiguring a merchant device that processes sales transactions. Reconfiguring the merchant device can include associating a new price (e.g., the suggested price of y dollars per unit) with an identifier (e.g., a stock-keeping unit number or a universal product code) of item A on the merchant device. Additional details on the merchant device and reconfiguring the merchant device are described below in reference to FIG. 3.

In the experiment, the system can change the price of item A for the duration of a time slot [T1, T2] where sales quantity of item A is determined to have deviated from an expected quantity. The system can configure the experiment to one time period (e.g., from 6:00 pm to 7:00 pm on a given day) or multiple time periods (e.g., from 6:00 pm to 7:00 pm every day for one week). During the experiment, the system records a sales quantity of the item at issue. During or after the experiment, the system can provide the sales quantity of item A at the suggested price for display in suggestion area 202 as experiment representation 204. The system can overlay the experiment representation 204 on expected sales representation 104, "current" (now historical) sales quantity representation 106, and projected sales quantity representation 108.

In addition, the system can calculate an increase (or decrease) in revenue or profit caused by the experiment, compared to the "current" sales quantity, which is now a historical sales quantity. The system can display the change in quantity (e.g., plus or minus X units) during the experiment period (time slot [T1, T2]) and the amount of increase or decrease in revenue or profit in experiment result area 210.

In some implementations, the system can perform an experiment on a group of items. The group of items can include items designated as being related to one another and subject to a same price policy. For example, physical store Acme can designate a group of items including notepads, pens, and calculators as a group having a label "stationary." Physical store Acme can apply a same "back to school" pricing policy for each item in this group. The system can present results of the experiment on the group in result area 210 as an integrated entry, rather than as individual entries. The system can automatically create the group based on common attributes of the items (e.g., a classification of the items), or create the group based on user selection.

The system can provide for display in user interface 200 option items 212, 214, 216, and 218. Upon receiving an input selecting the option item 212, the system can revert the experiment and change the price of an item (e.g., item A) or a group of items back to the price before the experiment at physical store Acme. Upon receiving an input selecting the option item 214, the system can perform a new experiment with a new suggested price. The system can determine the new suggested price (z dollars per unit) based at least in part on the result of the experiment (e.g., when the increase in sales quantity did not reach the projected increase in sales quantity). Upon receiving an input selecting the option item 216, the system can change price of item A to the suggested price at physical store Acme. Upon receiving an input selecting the option item 218, the system can perform routine calculations to determine if any deviation occurs. If yes, the system can change price of item A on an on-going basis, automatically and without user intervention.

Figure 3:
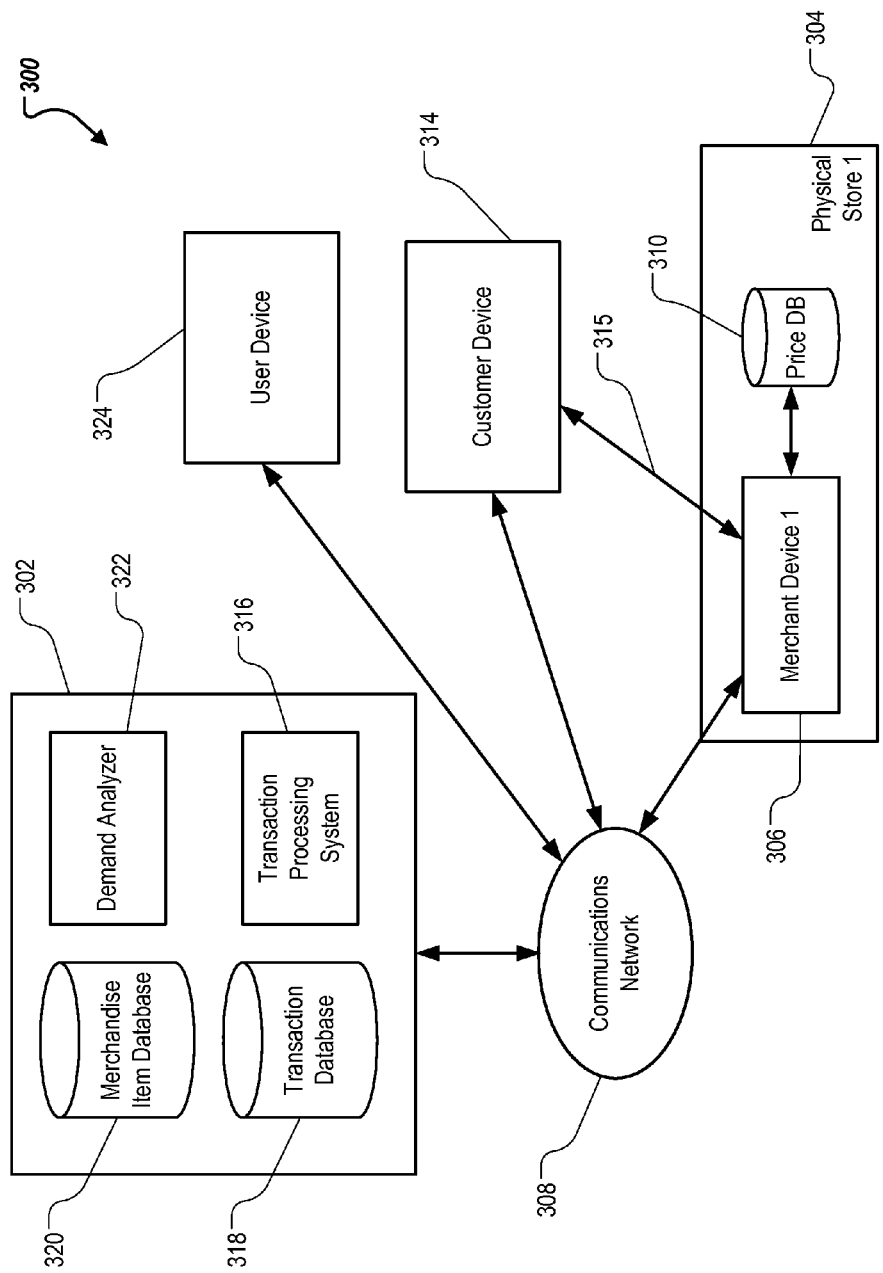
FIG. 3 is a block diagram illustrating exemplary components of a system implementing dynamic pricing for physical stores.

FIG. 3 is a block diagram illustrating exemplary components of system 300 implementing dynamic pricing for physical stores. System 300 includes a payment processing system 302. The payment processing system 302 includes one or more server computers programmed to process in-store sales transactions, including card payments for purchasing goods and services. The in-store sales transactions include customer-store transactions (e.g., retail transactions) that occurred in unrelated stores.

In an in-store transaction, a customer can buy an item of goods or services from a physical ("brick-and-mortar") store 304. The physical store 304 can be physical store "Acme" as described in reference to FIGS. 1 and 2. A merchant device 306 located at the physical store 304 can be programmed to handle the transaction, including displaying a price for an item and receiving payment information from a credit card, debit card, gift card, or loyalty card through a card swipe. In some implementations, the merchant device 306 can receive user account information. The merchant device 306 can use the account information to make an online payment for the item. The merchant device 306 receives the account information from a customer device 314 through wired or wireless communication 315. The customer device 314 can be a mobile computing device storing the user account information linked to a payment account. The merchant device 306 can submit the payment information or user account information to the payment processing system 302 through a communications network 308 for additional processing.

The merchant device 306 can include, or be coupled to, a price database 310. The price database 310 stores identifiers of items carried by the physical store 304. Each identifier is associated with a price of the corresponding item. The price can be specified manually (e.g., by an operator of the physical store 304) or be specified automatically by a computing device local at or remote from physical store 304. The price database 310 is shown to be located at physical store 304. In various implementations, the price database 310 can be located at physical store 304, in the payment processing system 302, or elsewhere.

The payment processing system 302 includes a transaction processing system 316. The transaction processing system 316 can include one or more computers configured to communicate with a card issuer (e.g., a credit card company) to approve a payment specified in the payment information. The transaction processing system 316 can include one or more computers configured to communicate with an online payment service to approve a payment using the user account information submitted by the merchant device 306. Upon successful approval, the transaction processing system 316 can inform merchant device 306, customer device 314, or both, that the payment is authorized. In the backend, the transaction processing system 316 can cause appropriate fund transfers between a customer's account and a merchant's account.

The payment processing system 302 can store transaction data related to the purchases handled by the transaction processing system 316 in a transaction database 318. The transaction database 318 can store transaction data including, for example, an identifier of the item purchased, a timestamp associated with the purchase, a purchase price, and a quantity (e.g., number of units of the item) of the purchase.

The payment processing system 302 includes a merchandise item database 320. The payment processing system 302, upon receiving purchase information from merchant device 306, can determine time-based price information from the purchase information, and store the time-based price information in the merchandise item database 320. The payment processing system 302 can store the time-based price information in association with an identifier of the item. In addition, the merchandise item database 320 can store a cost of each item as provided by operators of the physical stores. Like the price, the cost of each item can be time-based.

The payment processing system 302 includes a demand analyzer 322. The demand analyzer 322 can couple the transaction data stored in the transaction database 318 and the time-based price information stored in the merchandise item database 320 to determine a demand pattern. The demand analyzer 322 can perform the coupling of the transaction data and the time-based price information based on the identifiers of the items.

The demand analyzer 322 is programmed to determine deviations in transactions based on the demand pattern, and variables that correlate to the deviations. The demand analyzer 322 can determine whether price is a correlating variable and if yes, determine a suggested price or suggested change in price. Additional details on the operations of the demand analyzer 322 are described in reference to FIG. 4.

The payment processing system 302 can receive a request for demand analysis from a user device 324. The user device 324 can be a desktop, laptop, or tablet computer, a smart phone, or a wearable computing device. The user device 324 can be merchant device 306 or a different device. The user device 324 is programmed to communicate with the payment processing system 302 and request the demand analysis on one or more merchandise items (e.g., item A) carried by physical store 304. Upon receiving and authenticating the request, the payment processing system 302 can determine a suggested price using demand analyzer 322. If the payment processing system 302 receives a request to conduct an experiment using the suggested price, the demand analyzer 322 can update the price of each requested item in price database 310 and, optionally, in merchandise item database 320. The update can be reflected in a next purchase that occurs in a time slot associated with the suggested price. When the experiment is completed, the demand analyzer 322 can keep the suggested price or revert to the original price.

Only one physical store is illustrated in FIG. 3. In various implementations, other physical stores having the same configuration of physical store 304 can be connected through the network to the payment processing system 302. These physical stores can be different from, and unrelated to, physical store 304.

Figure 4:
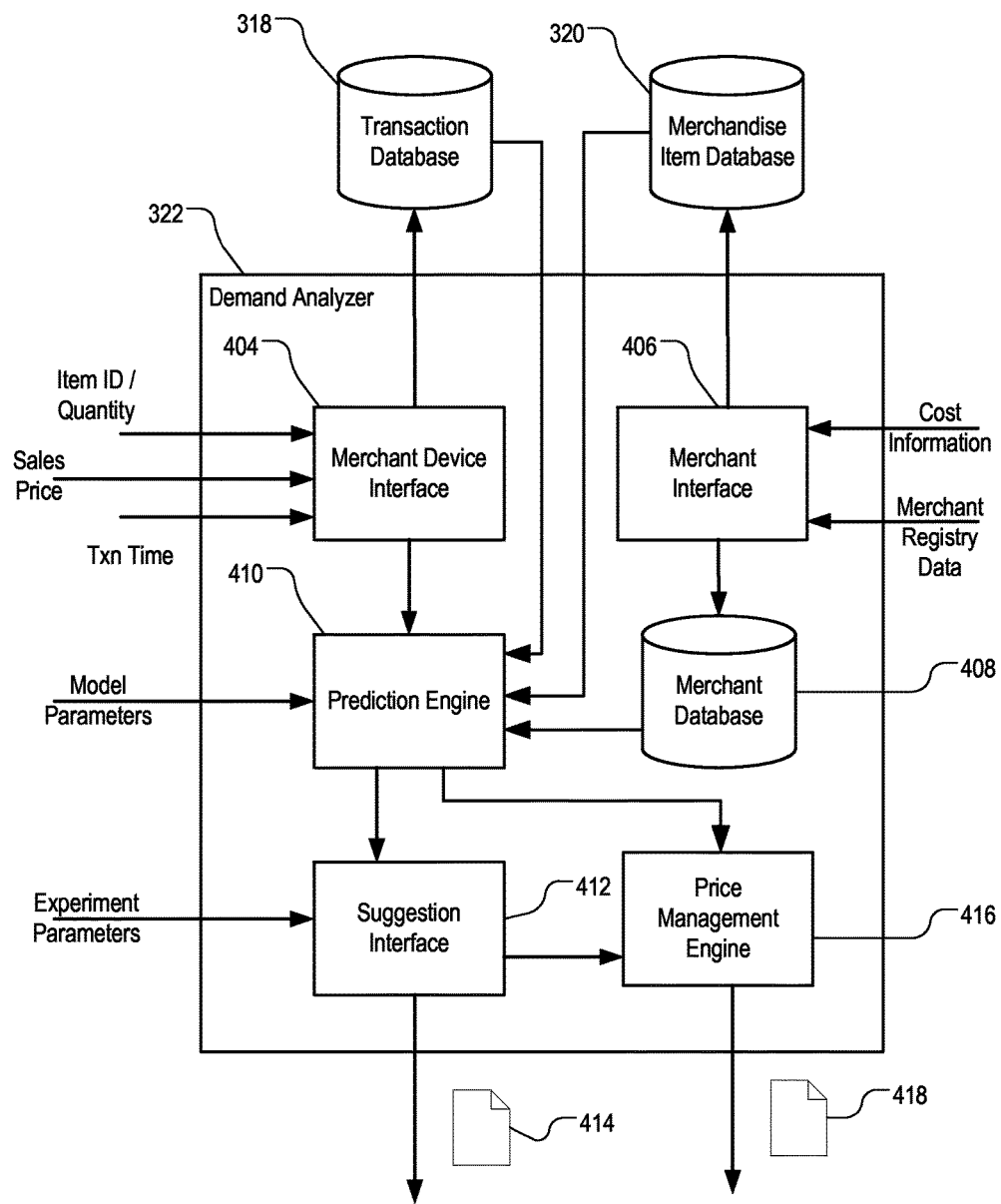
FIG. 4 is a block diagram illustrating exemplary components of a demand analyzer of FIG. 3.

FIG. 4 is a block diagram illustrating exemplary components of the demand analyzer 322 of FIG. 3. Each component of the demand analyzer 322 can include hardware and software components.

The demand analyzer 322 includes a merchant device interface 404. The merchant device interface 404 is a component of the demand analyzer 322 configured to receive from a merchant device, directly or through the transaction processing system 316 (of FIG. 3), transaction information. The transaction information includes an item identifier of an item sold, a sales price of the item, a quantity of the item sold, and a transaction timestamp. The merchant device interface 404 can store the transaction information in transaction database 318.

The demand analyzer 322 includes a merchant interface 406. The merchant interface 406 is a component of the demand analyzer 322 configured to receive, from a user device, cost information and merchant registry data. The cost information can include cost of each item for which a user seeks demand analysis. The merchant registry data can include a location (e.g., street address, city, state, country, and postal code) of a physical store operated by the merchant. The merchant interface 406 can store the cost information in the merchandise item database 320. The merchant interface 406 can store the merchant registry data in a merchant database 408.

The demand analyzer 322 includes a prediction engine 410. The prediction engine 410 is a component of the demand analyzer 322 configured to determine whether, during a specified period, sales quantity for an item or a group of items deviates from an expected quantity. If yes, the prediction engine 410 can determine if price of the item or the group of items is correlated to the deviation. If yes, the prediction engine 410 can determine a change in price or equivalently, a suggested price that can offset the deviation. The prediction engine 410 can make the determinations by applying a statistical model to transaction information stored in transaction database 318 (or from merchant device interface 404), cost information stored in merchandise item database 320, and merchant registry data in the merchant database 408. The prediction engine 410 can identify similar physical stores (e.g., stored located in a same city or same postal code area) using the merchant registry data.

In determining the change or the suggested price, the prediction engine 410 considers time-based cost of an item. For example, upon determining, based on user input, that cost of item A will increase or decrease in the future, the prediction engine 410 can determine the suggestion based on a future-cost sensitive rule. The future-cost sensitive rule can provide that, even if the decrease in price at a current time results in a temporary loss based on the current cost, a future gain caused by the increase in volume being applied to a future price at a future cost can offset the loss and can be a viable option.

The prediction engine 410 can adjust the statistical model according to various model parameter inputs. The model parameter inputs can include, for example, a length of the time period or a threshold for determining that a deviation is sufficiently significant. The model parameter inputs can specify whether to use historical sales quantity, comparative sales quantity, or a combination of the two to perform the demand analysis. The prediction engine 410 can generate the suggested price as an output.

The demand analyzer 322 includes a suggestion interface 412. The suggestion interface 412 is a component of the demand analyzer 322 configured to determine various user interfaces (e.g., user interfaces 100 and 200 of FIG. 1 and FIG. 2, respectively). The suggestion interface 412 can provide the user interfaces to a user device for presentation. The suggestion interface 412 can provide suggested price 414 for presentation in the user interfaces.

The suggestion interface 412 can receive one or more experiment parameters from the user interfaces. The experiment parameters can include whether to conduct an experiment, whether to revert to an original price after an experiment is completed, or whether to use demand analyzer 322 to set future prices of the item. The suggestion interface 412 can provide the parameters to a price management engine 416.

The price management engine 416 is a component of demand analyzer 322 configured to receive a suggested price from the prediction engine 410, and set the sales price to the suggested price at a physical store according the parameters received from the suggestion interface 412. The price management engine 416 can determine price schedule 418, which includes prices of an item at various time. For example, the price schedule 418 can specify that the price for item A is x dollars per unit, except for the time slot between 5 pm and 6 pm on weekdays. The price schedule 418 can specify that in this time slot, the price of item A is y dollars per unit (where the is a suggested price). The price management engine 416 can provide the price schedule 418 to a price database of a physical store. The price of item A in the physical store can then be a dynamic price, controlled by demand analyzer 322 and varying over time.

Figure 5:
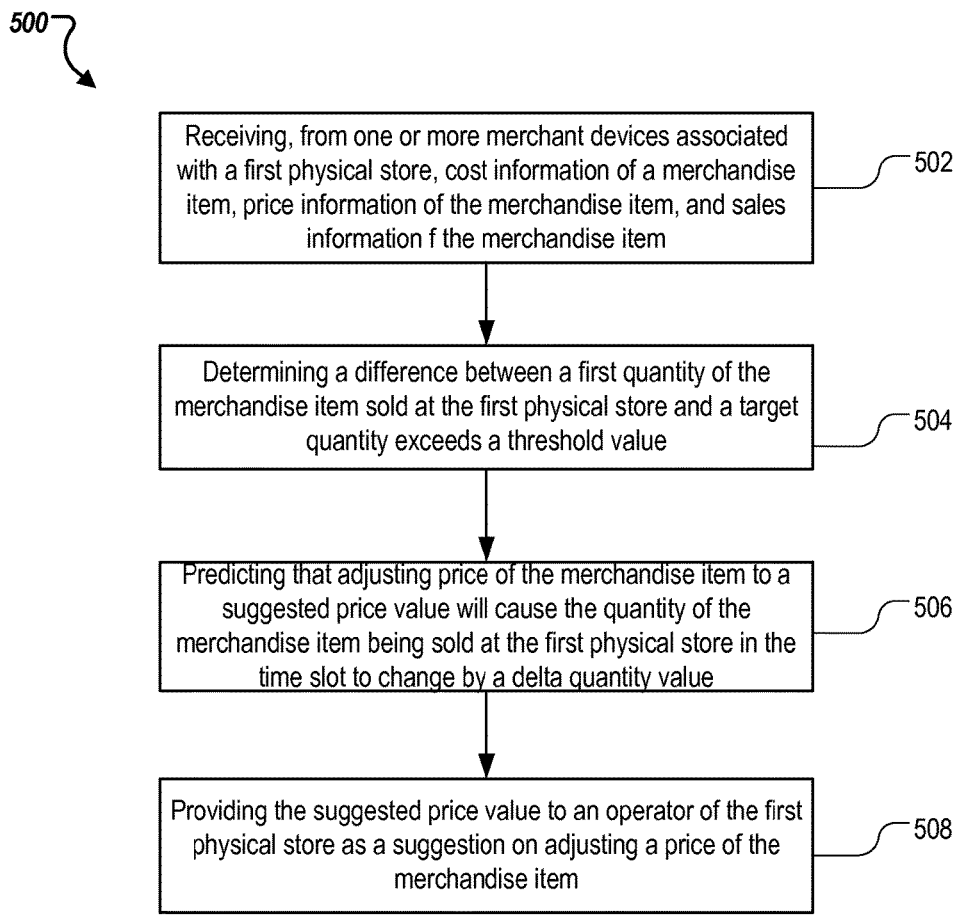
FIGS. 5 and 6 are flowcharts illustrating exemplary procedures of dynamic pricing for a physical store.

FIG. 5 is a flowchart illustrating exemplary procedure 500 of dynamic pricing operations for a physical store. Procedure 500 can be performed by a system, e.g., system 300 of FIG. 3.

The system can receive (502), from one or more merchant devices associated with a first physical store, cost information of a merchandise item, price information of the merchandise item, and sales information of the merchandise item. The merchandise item can include a unit of goods or services being sold at the first physical store. The sales information can include quantity of the merchandise item being sold over a time period at the first physical store.

The system can determine (504), based on the sales information, that, in a time slot in the time period, a difference between a first quantity of the merchandise item sold at the first physical store and a target quantity of the merchandise item sold at the first physical store exceeds a threshold value. The target quantity of the merchandise item sold at the first physical store can be a quantity determined based on anonymized sales information of the merchandise item. The system can receive the anonymized sales information from one or more merchant devices associated with one or more second physical stores. In some implementations, the time period is a day. The time slot can be an hour or a time unit smaller than an hour. In some implementations, the time period can be a week, a month, or a year. The time slot can be a day or a time unit smaller than a day.

In response, the system can predict (506), based on the price information received from the one or more merchant devices associated with the first physical store, the anonymized sales information, and anonymized price information received from the one or more merchant devices associated with the one or more second physical stores, that adjusting price of the merchandise item to a suggested price will cause the quantity of the merchandise item being sold at the first physical store in the time slot to change by a delta quantity value. The system can determine the suggested price based on a rule specifying that, after the change in price, the difference between a first quantity of the merchandise item sold at the first physical store and a target quantity of the merchandise item sold at the first physical store is expected to be reduced to below the threshold value.

The system can provide (508) the suggested price to an operator of the first physical store as a suggestion on adjusting a price of the merchandise item during the time slot. For example, the system can present, on a display device, the increase in the revenue or the profit as a reason of the suggestion. Providing the suggested price is based on an estimation that the suggested price and the delta quantity value cause an increase in at least one of a revenue or a profit of selling the merchandise item at the first physical store.

Figure 6:
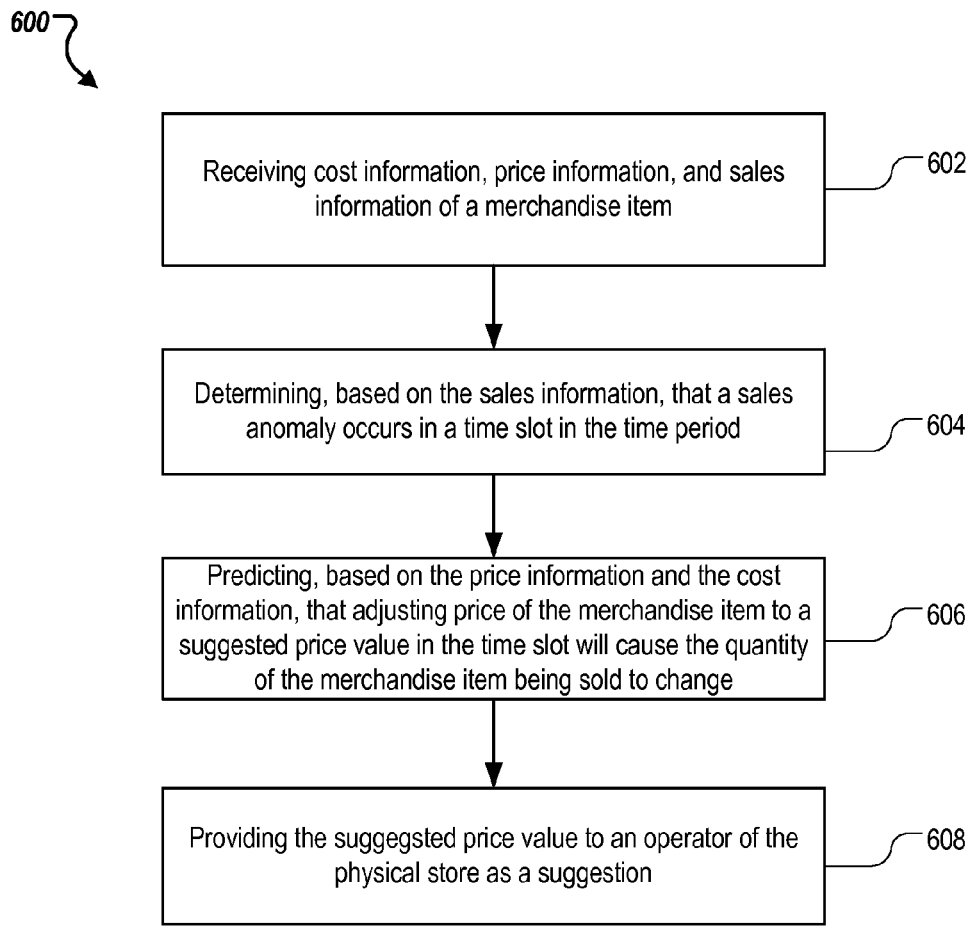

FIG. 6 is a flowchart illustrating exemplary procedure 600 of dynamic pricing operations for a physical store. Procedure 500 can be performed by a system, e.g., system 300 of FIG. 3.

The system receives (602) cost information, price information, and sales information of a merchandise item sold at a physical store. The sales information includes quantity of the merchandise item being sold over a time period at the physical store.

The system determines (604), based on the sales information, that a sales variance occurs in a time slot in the time period. The sales variance can include a dip or spike in the quantity of the merchandise item being sold in the time slot. The dip or spike is a deviation from a statistical average that exceeds a threshold value. The system can determine that the sales variance occurs in a time slot upon determining, based on the sales information, that the quantity of the merchandise item being sold in the time slot deviates, by at least a threshold amount, from an expected quantity. The system can determine the expected quantity based on at least one of (1) a quantity of the merchandise item being sold in one or more comparable physical stores, or (2) a quantity of the merchandise item being sold in the physical store in at least one other time slot in the time period.

In response, the system predicts (606), based on the price information and the cost information, that adjusting price of the merchandise item to a suggested price in the time slot will cause the quantity of the merchandise item being sold at the first physical store in the time slot to change by a delta quantity value that at least partially offsets the sales variance. In making the prediction, the system can determine that the suggested price is greater than or equals to cost of the merchandise item. Making the prediction can include determining, based on a probabilistic model, that a variable most strongly correlated to the dip or spike is the price of the merchandise item being sold at the physical store in the time slot. The system can then determine the suggested price based on a magnitude of the dip or spike and a degree of correlation between the price and the dip or spike.

The system provides (608) the suggested price to an operator of the physical store as a suggestion on adjusting the price of the merchandise item during the time slot. Providing the suggested price can include providing a first option (e.g., option item 110 of FIG. 1 or option item 212 of FIG. 2) of rejecting the suggested price, providing a second option (e.g., option item 112 of FIG. 1 or option item 214 of FIG. 2) of performing an experiment of adjusting the price of the merchandise item to the suggested price, and providing a third option (e.g., option item 116 of FIG. 1 or option item 218 of FIG. 2) of automatically determining, by the system, time-based prices of the merchandise item being sold at the physical store. In some implementations, the system provide the suggestion on adjusting the price of the merchandise item and suggestions on adjusting prices of a group of merchandise items including the merchandise item as packaged information for display in a dashboard on a user device.

Upon receiving the second option of performing an experiment, the system experiments with the suggested price. In the experiment, the system causes the one or more merchant devices associated with the physical store to adjust the price of the merchandise item to the suggested price for duration of the time slot. The system then determines, based on results of experimenting the suggested price, whether a change in the quantity of merchandise item sold during the time slot coincides with the predicted delta quantity value. The system provides, to the operator of the physical store, a coincidence, or a non-coincidence for display on a display device.

Upon receiving the third option of automatically determining, the system determines a time-based price schedule of selling the merchandise item at the physical store based on a location of the physical store. The system then automatically adjusts, the price of the merchandise item being sold at the physical store according to the time-based price schedule.

Figure 7:
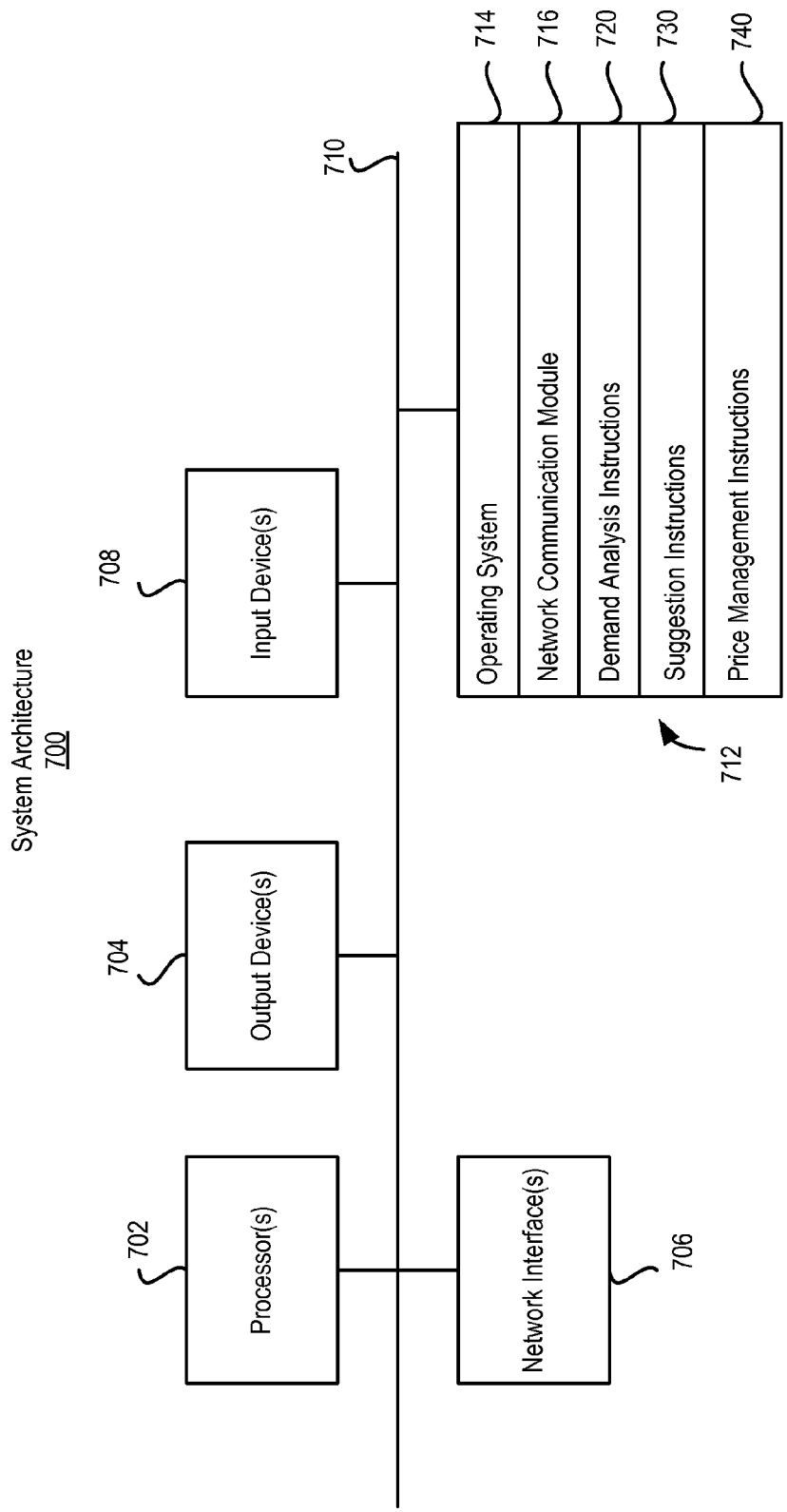
FIG. 7 is a block diagram of an exemplary system architecture for implementing the features and operations of FIGS. 1-6.

FIG. 7 is a block diagram of exemplary system architecture 700 for implementing the features and operations of FIGS. 1-6. Other architectures are possible, including architectures with more or fewer components. System architecture 700 can be implemented by payment processing system 302 of FIG. 3. In some implementations, architecture 700 includes one or more processors 702 (e.g., dual-core Intel® Xeon® Processors), one or more output devices 704 (e.g., LCD), one or more network interfaces 706, one or more input devices 708 (e.g., mouse, keyboard, touch-sensitive display) and one or more computer-readable mediums 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to any medium that participates in providing instructions to processor 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 712 can further include operating system 714 (e.g., Mac OS® server, Windows Server®, Android®, or iOS®), network communication module 716, demand analysis instructions 720, suggestion instructions 730, and price management instructions 740. Operating system 714 can be multi-user, multiprocessing, multitasking, multithreading, real time, etc. Operating system 714 performs basic tasks, including but not limited to: recognizing input from and providing output to devices 706, 708; keeping track and managing files and directories on computer-readable mediums 712 (e.g., memory or a storage device); controlling peripheral devices; and managing traffic on the one or more communication channels 710. Network communications module 716 includes various components for establishing and maintaining network connections (e.g., software for implementing communication protocols, such as TCP/IP, HTTP, etc.). Demand analysis instructions 720 can include instructions that, when executed, causes processor 702 to perform operations of prediction engine 410 as described above in reference to FIG. 4. Suggestion instructions 730 can include instructions that, when executed, causes processor 702 to perform operations of suggestion interface 412 as described above in reference to FIG. 4. Price management instructions 740 can include instructions that, when executed, causes processor 702 to perform operations of price management engine 406 as described above in reference to FIG. 4.

Architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C++, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention.

What is claimed is:
1. A method comprising:
receiving, at a payment processing system, from one or more merchant devices located at a physical store, price information, and sales information of a merchandise item sold at the physical store, the sales information including a quantity of the merchandise item being sold over a time period at the physical store;
determining, at the payment processing system, based on the sales information, that a sales variance occurs in a time slot within the time period, the sales variance including a dip or spike in the quantity of the merchandise item being sold in the time slot, the dip or spike being a deviation from a statistical average that exceeds a threshold amount;
in response to determining the sales variance occurs in the time slot within the time period, predicting, at the payment processing system, based on the price information, that increasing or decreasing a price of the merchandise item to an adjusted price in the time slot will cause the quantity of the merchandise item being sold at the physical store in the time slot to change by a delta quantity value that at least partially offsets the sales variance;
adjusting, by the payment processing system, via the one or more merchant devices associated with the physical store, the price of the merchandise item to the adjusted price for a duration of the time slot;

receiving, at the payment processing system, a first indication of sales of the merchandise item at the adjusted price during the duration of the time slot;

determining, at the payment processing system, whether a change in a quantity of the merchandise item sold during the duration of the time slot corresponds to the predicted delta quantity value; and providing, by the payment processing system, to at least one device of the one or more merchant devices, a second indication of whether the change in quantity corresponds to the predicted delta quantity value, the second indication for display on a display device, wherein the method is performed by one or more computing devices at the payment processing system, and wherein the one or more merchant devices are programmed to:
- display at least one of the price or the adjusted price for the merchandise item; and
- receive customer account information regarding payment for the merchandise item.

2. The method of claim 1, wherein determining that the sales variance occurs in a time slot comprises determining, based on the sales information, that the quantity of the merchandise item being sold in the time slot deviates, by at least a threshold amount, from at least one of:
- a quantity of the merchandise item being sold in one or more comparable physical stores, or
- a quantity of the merchandise item being sold in the physical store in at least one other time slot within the time period.

3. The method of claim 2, wherein adjusting the price of the merchandise item to the adjusted price will cause the quantity of the merchandise item being sold at the physical store in the time slot to change comprises:
- determining, based on a probabilistic model, that a variable most strongly correlated to the dip or spike is the price of the merchandise item being sold at the physical store in the time slot; and
- determining the adjusted price based on a magnitude of the dip or spike and a degree of correlation between the price and the dip or spike.

4. The method of claim 1, wherein providing the adjusted prices comprises:
- providing an option of rejecting the adjusted price; and
- providing an option of automatically determining time-based prices of the merchandise item being sold at the physical store using the one or more computing devices.

5. The method of claim 4, comprising, upon receiving a selection of the option of automatically determining time-based prices of the merchandise item:
- determining a time-based price schedule of selling the merchandise item at the physical store based on a location of the physical store; and
- automatically adjusting, by the one or more computing device, the price of the merchandise item being sold at the physical store according to the time-based price schedule.

6. The method of claim 1, comprising:
providing a suggestion, from the payment processing system, to the one or more merchant devices, on adjusting the price of the merchandise item and suggestions on adjusting prices of a group of merchandise items including the merchandise item as packaged information for display in a dashboard on a user device.

7. A system, comprising:
one or more computing devices;

a non-transitory computer readable medium storing instructions operable to cause the one or more computing devices to perform operations comprising:
receiving, at a payment processing system, from one or more merchant devices located at a physical store, price information, and sales information of a merchandise item sold at a physical store, the sales information including a quantity of the merchandise item being sold over a time period at the physical store;

determining, at the payment processing system, based on the sales information, that a sales variance occurs in a time slot within the time period, the sales variance including a dip or spike in the quantity of the merchandise item being sold in the time slot, the dip or spike being a deviation from a statistical average that exceeds a threshold amount;

in response to determining the sales variance occurs in the time slot within the time period, predicting, at the payment processing system, based on the price information, that increasing or decreasing a price of the merchandise item to an adjusted price in the time slot will cause the quantity of the merchandise item being sold at the physical store in the time slot to change by a delta quantity value that at least partially offsets the sales variance;

adjusting, by the payment processing system, via the one or more merchant devices associated with the physical store the price of the merchandise item to the adjusted price for a duration of the time slot;

receiving, at the payment processing system, a first indication of sales of the merchandise item at the adjusted price during the duration of the time slot;

determining, at the payment processing system, whether a change in a quantity of the merchandise item sold during the duration of the time slot corresponds to the predicted delta quantity value; and providing, by the payment processing system, to at least one device of the one or more merchant devices, a second indication of whether the change in quantity corresponds to the predicted delta quantity value, the second indication for display on a display device, wherein the one or more merchant devices being programmed to:
- display at least one of a price or the adjusted price for the merchandise item; and
- receive customer account information in payment for the merchandise item.

8. The system of claim 7, wherein determining that the sales variance occurs in a time slot comprises determining, based on the sales information, that the quantity of the merchandise item being sold in the time slot deviates, by at least a threshold amount, from at least one of:
- a quantity of the merchandise item being sold in one or more comparable physical stores, or
- a quantity of the merchandise item being sold in the physical store in at least one other time slot within the time period.

9. The system of claim 8, wherein predicting that adjusting price of the merchandise item to the adjusted price will cause the quantity of the merchandise item being sold at the physical store in the time slot to change comprises:
- determining, based on a probabilistic model, that a variable most strongly correlated to the dip or spike is the price of the merchandise item being sold at the physical store in the time slot; and determining the adjusted price based on a magnitude of the dip or spike and a degree of correlation between the price and the dip or spike.

10. The system of claim 7, wherein providing the adjusted price further comprises:
providing an option of rejecting the adjusted price; and
providing and option of automatically determining time based prices of the merchandise item being sold at the physical store using the one or more computing devices.

11. The system of claim 10, the operations comprising, upon receiving a selection of the option of automatically determining time based prices of the merchandise item:
determining a time based price schedule of selling the merchandise item at the physical store based on a location of the physical store; and
automatically adjusting, by the one or more computing device, the price of the merchandise item being sold at the physical store according to the time based price schedule.

12. The system of claim 7, the operations comprising:
providing a suggestion on adjusting the price of the merchandise item and suggestions on adjusting prices of a group of merchandise items including the merchandise item as packaged information for display in a dashboard on a user device.

13. A non-transitory computer readable medium storing instructions operable to cause one or more computing devices to perform operations comprising:
receiving, at a payment processing system, from one or more merchant devices located at a physical store, cost information, price information, and sales information of a merchandise item sold at a physical store, the sales information including a quantity of the merchandise item being sold over a time period at the physical store;
determining, at the payment processing system, based on the sales information, that a sales variance occurs in a time slot within the time period, the sales variance including a dip or spike in the quantity of the merchandise item being sold in the time slot, the dip or spike being a deviation from a statistical average that exceeds a threshold amount;
in response to determining the sales variance occurs in the time slot within the time period, predicting, at the payment processing system, based on the price information and the cost information, that increasing or decreasing a price of the merchandise item to an adjusted price in the time slot will cause the quantity of the merchandise item being sold at the physical store in the time slot to change by a delta quantity value that at least partially offsets the sales variance, including determining that the adjusted price is greater than or equal to a cost of the merchandise item;
adjusting, by the payment processing system, via the one or more merchant devices associated with the physical store to adjust the price of the merchandise item to the adjusted price for a duration of the time slot;
receiving a first indication of sales of the merchandise item at the adjusted price during the duration of the time slot;
determining, at the payment processing system, whether a change in a quantity of the merchandise item sold during the duration of the time slot corresponds to the predicted delta quantity value;
providing, by the payment processing system, to at least one device of the one or more merchant devices, a second indication of whether the change in quantity corresponds to the predicted delta quantity value, the second indication for display on a display device, and
providing the adjusted price to an operator of the physical store of the merchandise item during the time slot,
wherein the one or more merchant devices being programmed to:
display at least one of the price or the adjusted price for the merchandise item; and
receive customer account information in payment for the merchandise item.

14. The non-transitory computer readable medium of claim 13, wherein determining that the sales variance occurs in a time slot comprises determining, based on the sales information, that the quantity of the merchandise item being sold in the time slot deviates, by at least a threshold amount, from at least one of:
a quantity of the merchandise item being sold in one or more comparable physical stores, or
a quantity of the merchandise item being sold in the physical store in at least one other time slot within the time period.

15. The non-transitory computer readable medium of claim 14, wherein predicting that adjusting the price of the merchandise item to the adjusted price will cause the quantity of the merchandise item being sold at the physical store in the time slot to change comprises:
determining, based on a probabilistic model, that a variable most strongly correlated to the dip or spike is the price of the merchandise item being sold at the physical store in the time slot; and
determining the adjusted price based on a magnitude of the dip or spike and a degree of correlation between the price and the dip or spike.

16. The non-transitory computer readable medium of claim 13, wherein adjusting the adjusted price further comprises:
providing an option of rejecting the adjusted price; and
providing an option of automatically determining time based prices of the merchandise item being sold at the physical store using the one or more computing devices.

17. The non-transitory computer readable medium of claim 16, the operations comprising, upon receiving a selection of the option of automatically determining time based prices of the merchandise item:
determining a time based price schedule of selling the merchandise item at the physical store based on a location of the physical store; and
automatically adjusting, by the one or more computing device, the price of the merchandise item being sold at the physical store according to the time based price schedule.

18. The non-transitory computer readable medium of claim 13, the operations comprising:
providing a suggestion on adjusting the price of the merchandise item and suggestions on adjusting prices of a group of merchandise items including the merchandise item as packaged information for display in a dashboard on a user device.

* * * * *